United States Patent
Kang

[11] Patent Number: 6,061,187
[45] Date of Patent: May 9, 2000

[54] ZOOM LENS SYSTEM WITH A HIGH ZOOM RATIO

[75] Inventor: Geon-Mo Kang, Kyeongsangnam-do, Rep. of Korea

[73] Assignee: Samsung Aerospace Industries, Ltd., Rep. of Korea

[21] Appl. No.: 09/133,635

[22] Filed: Aug. 13, 1998

[30] Foreign Application Priority Data

Aug. 14, 1997 [KR] Rep. of Korea ................. 97-39003

[51] Int. Cl.⁷ ............................................ G02B 15/14
[52] U.S. Cl. ................................................ 359/689
[58] Field of Search .............................. 359/689, 686, 359/683, 676

[56] References Cited

U.S. PATENT DOCUMENTS

| | | | |
|---|---|---|---|
| 4,983,027 | 1/1991 | Kojima et al. | 359/689 |
| 5,633,759 | 5/1997 | Nagata et al. | 359/686 |
| 5,777,799 | 7/1998 | Miyauchi | 359/689 |
| 5,781,348 | 7/1998 | Ohtake | 359/683 |
| 5,793,535 | 8/1998 | Ito et al. | 359/689 |

FOREIGN PATENT DOCUMENTS

| | | |
|---|---|---|
| 2-37317 | 2/1990 | Japan . |
| 2-201410 | 8/1990 | Japan . |
| 2-287507 | 11/1990 | Japan . |
| 4-165319 | 6/1992 | Japan . |
| 6-059192 | 3/1994 | Japan . |
| 2-73211 | 3/1999 | Japan . |

*Primary Examiner*—Georgia Epps
*Assistant Examiner*—Jordan M. Schwartz
*Attorney, Agent, or Firm*—Fish & Richardson P.C.

[57] ABSTRACT

A zoom lens system includes, when viewed from an object side, a first lens group with a positive refractive power; a second lens group with a positive refractive power; and a third lens group with a negative refractive power. When zooming from a wide-angle position to a telephoto position, the first, second and third lens groups move towards the object side while the distance between the first lens group and the second lens group increases and the distance between the second lens group and the third lens group decreases. The zoom lens system is compact and has a high zoom ratio of more than 3.5.

14 Claims, 8 Drawing Sheets

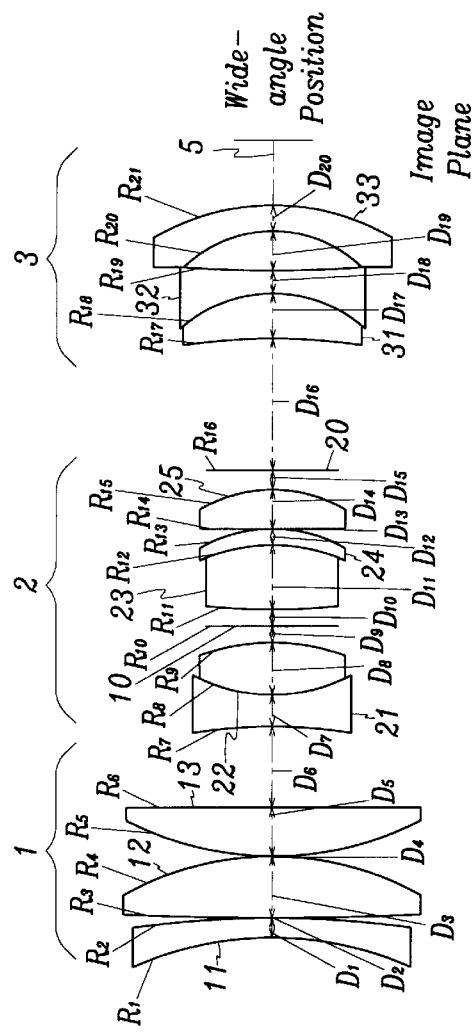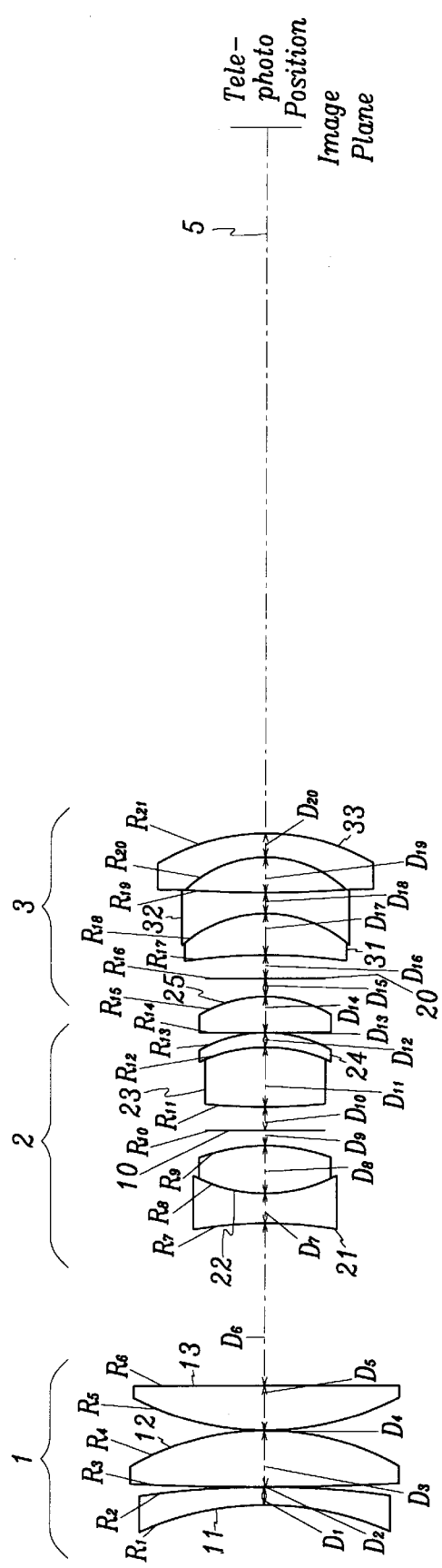
FIG. 10A
FIG. 10B

ZOOM LENS SYSTEM WITH A HIGH ZOOM RATIO

BACKGROUND OF THE INVENTION (a) Field of the Invention

The present invention relates to a zoom lens system and, more particularly, to a zoom lens system for a compact camera having a high zoom ratio and having three lens groups.

(b) Description of the Related Art

Automatic compact cameras have recently been provided with zoom lens system.

Generally, zoom lens systems for compact cameras can be divided into two types: a first type with two lens groups and a second type with three lens groups. The first type with two lens groups is compact and lightweight, but does not provide a high magnification. Accordingly, the first type with two lens groups is used for zoom lens systems with a zoom ratio of less than 3.0.

The second type with three lens groups is subdivided into two classes. The first class includes, when viewed from the object side, a first lens group with a negative refractive power, a second lens group with a positive refractive power and a third lens group with a negative refractive power. The second class includes a first lens group with a positive refractive power, a second lens group with a positive refractive power and a third lens group with a negative refractive power.

Zoom lens systems of the first class are disclosed in Japanese Publication Nos. Hei 2-201410 and Hei 2-37317. These zoom lens systems can have large aperture and zoom ratios. However, theses zoom lens systems have a considerable total length and a large outside diameter, making them unsuitable for compact cameras.

Zoom lens systems of the second class are disclosed in Japanese Publication Nos. Hei 6-59192, Hei 2-73211, Hei 2-287507 and Hei 4-165319. These zoom lens systems can be conveniently constructed in compact form. However, these zoom lens systems have a zoom ratio of less than 3.0, which makes it difficult to obtain a high zoom ratio.

SUMMARY OF THE INVENTION

In view of the prior art described above, it is an object of the present invention to provide a zoom lens system having a high zoom ratio of more than 3.5.

It is another object of the present invention to provide a compact zoom lens system having a high zoom ratio.

To achieve these objects and other advantages, the invention comprises a zoom lens system including, when viewed from the object side, a first lens group with a positive refractive power; a second lens group with a positive refractive power; and a third lens group with a negative refractive power. When zooming from a wide-angle position to a telephoto position, the first, second and third lens groups move towards the object side while at the same time the distance between the first lens group and the second lens group increases and the distance between the second lens group and the third lens group decreases. The first lens group includes a meniscus lens which has a negative refractive power and a concave surface facing the object side.

It is to be understood that both the foregoing general description and the following detailed description are exemplary and are intended to further explain the claimed invention.

BRIEF DESCRIPTION OF THE DRAWINGS

The above objects and feature of the present invention will be apparent from the following description of the preferred embodiment with reference to the accompanying drawing.

FIGS. 10A and 10B are side views of a zoom lens system in the wide-angle and telephoto positions, respectively, according to a fourth embodiment of the present invention at each position;

DETAILED DESCRIPTION OF THE PREFERRED EMBODIMENTS

Figures 1A, 1B:
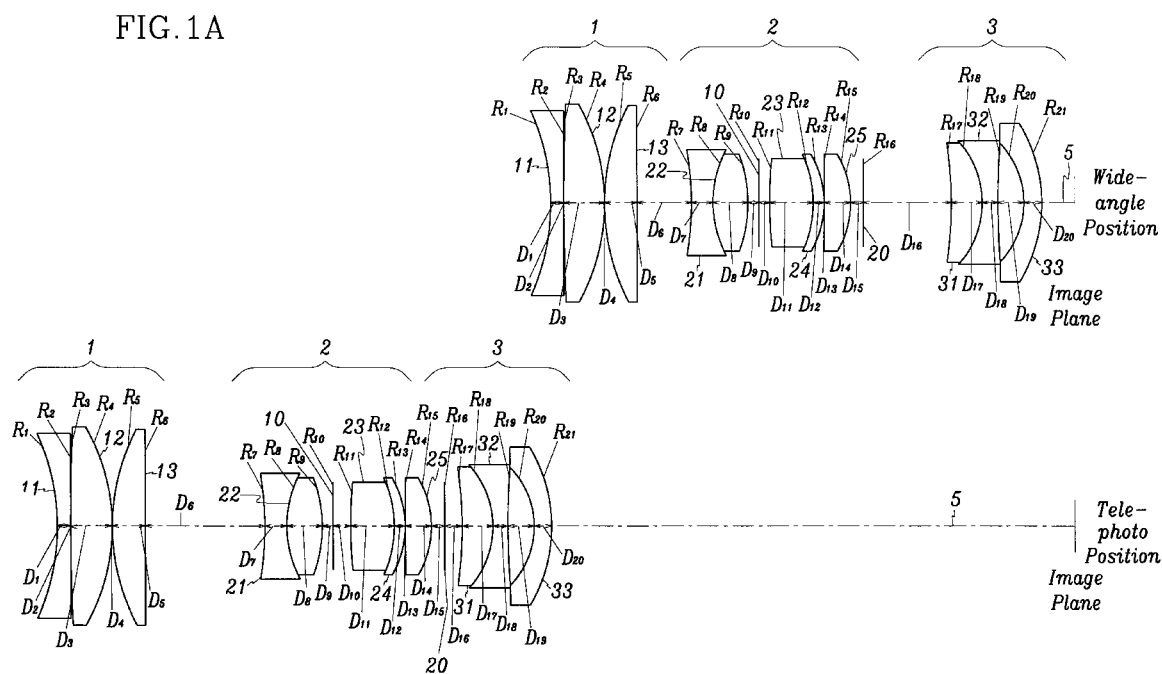
FIGS. 1A and 1B are side views of a zoom lens system in the wide-angle and telephoto positions, respectively, according to a first embodiment of the present invention.

The present invention will be described in detail with reference to the accompanying drawings.

In the preferred embodiment according to the present invention, as shown in FIGS. 1A, 1B, 4A, 4B, 7A, 7B, 10A and 10B, when viewed from the object side, a first lens group 1 with a positive refractive power, a second lens group 2 with a positive refractive power and a third lens group 3 with a negative refractive power are arranged on a common optical axis 5.

The first lens group 1 includes a first lens 11 which is a meniscus lens with a negative refractive power and a concave surface facing the object side, a second lens 12 which has a positive refractive power and a convex surface facing the image side and a third lens 13 which has a positive refractive power and a convex surface facing the object side.

The second lens group 2 includes a fourth biconcave lens 21 with a negative refractive power, a fifth biconvex lens 22 which is cemented to the fourth lens 21 and has a positive refractive power, a sixth lens 23 which has a positive refractive power and a convex surface facing the image side, a seventh meniscus lens 24 which is cemented to the sixth lens 23 and has a negative refractive power and a convex surface facing the image side and a eighth lens 25 which has a positive refractive power and a convex surface facing the image side.

The third lens group 3 includes a ninth lens 31 which has a positive refractive power and a convex surface facing the image side, a tenth lens 32 which is cemented to the ninth lens 31 and has a negative refractive power and a concave surface facing the object side and a eleventh meniscus lens 33 which has a negative refractive power and a convex surface facing the image side. The tenth lens 32 contacts the ninth lens 31, thereby forming a cemented lens with a negative refractive power.

A first aperture 10 is positioned between the fifth lens 22 and the sixth lens 23. A second aperture 20 is positioned between the second lens group 2 and the third lens group 3.

When zooming from a wide-angle position to a telephoto position, the first, second and third lens groups 1, 2, and 3 move along the common optical axis 5 while at the same time the distance between the first lens group 1 and the second lens group 2 increases and the distance between the second lens group 2 and the third lens group 3 decreases.

The zoom lens system according to a first embodiment of the present invention has the above-mentioned construction and satisfies the following conditions:

$$ft/fw > 4.10 \tag{1}$$

$$Lt/ft < 0.90 \tag{2}$$

$$1.60 < (Lt-Lw)/fw < 2.30 \tag{3}$$

$$1.60 < (fbt-fbw)/fw < 2.30 \tag{4}$$

$$1.30 < f1/fw < 1.70 \tag{5}$$

$$0.60 < f2/fw < 1.00 \tag{6}$$

$$0.30 < |f3/fw| < 0.70 \tag{7}$$

wherein fw is the focal length of the zoom lens system at a wide-angle position;

ft is the focal length of the zoom lens system at a telephoto position;

Lw is the distance between the surface facing the object of the first lens 11 of the first lens group 1 and the focal plane at the wide-angle position;

Lt is the distance between the surface of the lens 11 closest to the object side and the focal plane at the telephoto position;

fbw is the back focal length at the wide-angle position;

fbt is the back focal length at the telephoto position;

f1 is the focal length of the first lens group 1;

f2 is the focal length of the second lens group 2; and f3 is the focal length of the third lens group 3.

The conditions (1) and (2) are important for obtaining of a high zoom ratio and a compact zoom lens system. If the conditions (1) and (2) are not satisfied, a high zoom ratio and a compact zoom lens system are difficult to achieve.

The conditions (3) and (4) relate to the displacement of the first lens group 1 and the third lens group 3 when zooming. It is possible to make the zoom lens system compact, even if the lower limits of conditions (3) and (4) are violated. However, the refractive power of the first lens group 1 and the third lens group 3 increases, which exacerbates the change in the aberration when zooming.

If the upper limits of conditions (3) and (4) are violated, the change in the aberration during zooming can still be controlled. However, it would be difficult to achieve a compact zoom lens system.

The condition (5) relates to the refractive power of the first lens group 1. If the lower limit of condition (5) is violated, then the refractive power of the first lens group 1 increases, making it easy to obtain a compact zoom lens system and to compensate for aberrations. However, the back focal length becomes short, so that the size of the lenses of the third lens group 3 increases. If the upper limit of condition (5) is violated, then it becomes difficult to obtain a compact the zoom lens system.

The condition (6) relates to the refractive power of the second lens group 2. If the lower limit of condition (6) is violated, then the refractive power of the second lens group 2 increases substantially, thereby increasing both spherical aberration and coma.

If the upper limit of condition (6) is violated, then the change in the aberration is stabilized, but the displacement of the second lens group 2 increases making it is difficult to obtain a compact zoom lens system.

The condition (7) relates to the refractive power of the third lens group 3. If the lower limit of condition (7) is violated, then the refractive power of the third lens group 3 increases, thereby increasing astigmatism and curvature of field. If the upper limit of condition (7) is violated, it becomes difficult to obtain a high zoom ratio.

Data for the first embodiment of the present invention satisfying the conditions (1) to (7) are shown in Table 1 in which the half viewing angle ranges from 28.44 to 7.10, the focal length ranges from 39.500 mm to 172.968 mm, the back focal length ranges from 8.221 mm to 90.979 mm, and the F number ranges from 4.60 to 12.63.

In the Tables, the units of measurement for all linear dimensions are millimeters and the following variables are used:

$R_i$ (i=1–21) is the radius of curvature of a refractive surface;

$D_i$ (i=1–20) is the thickness of a lens or the separation between the lens units;

nd represents the d-line refractive index of a lens unit; and v represents the Abbe number of a lens unit.

TABLE 1

| surface number | Radius of curvature $R_i$ | distance $D_i$ | refractive power nd | Abbe number v |
|---|---|---|---|---|
| 1 | −29.623 | 1.00 | 1.83400 | 37.34 |
| 2 | −2795.089 | 0.10 | | |
| 3 | 89.124 | 4.00 | 1.51823 | 58.96 |
| 4 | −27.409 | 0.10 | | |
| 5 | 28.959 | 3.11 | 1.48749 | 70.44 |
| 6 | −1460.752 | A | | |
| 7 | −22.762 | 2.50 | 1.83500 | 42.98 |
| 8 | 13.704 | 3.50 | 1.72825 | 28.32 |
| 9 | −36.180 | 1.21 | | |
| 10 | ∞ | 1.14 | | |
| 11 | 83.181 | 6.60 | 1.51680 | 64.20 |
| 12 | −12.556 | 0.95 | 1.84666 | 23.78 |
| 13 | −26.233 | 0.10 | | |
| 14 | −316.242 | 2.98 | 1.58913 | 61.25 |
| 15* | −19.836 | 1.20 | | |
| 16 | ∞ | B | | |

TABLE 1-continued

| surface number | Radius of curvature $R_i$ | distance $D_i$ | refractive power nd | Abbe number ν |
|---|---|---|---|---|
| 17* | −36.587 | 3.47 | 1.81474 | 37.03 |
| 18 | −12.665 | 1.00 | 1.48749 | 70.44 |
| 19 | 56.027 | 4.55 | | |
| 20 | −13.575 | 1.20 | 1.80420 | 46.50 |
| 21 | −49.060 | | | | where * denotes an aspherical surface and A ranges from 2.8500 mm to 14.6832 mm and B ranges from 15.2224 mm to 2.6100 mm during zooming.

The aspherical lenses of the zoom lens system according to the embodiment are characterized by the following equation:

$$Z = Cy^2 / \{1 + (1-(k+1)C^2y^2)^{1/2}\} + A4S^4 + A6S^6 + A8S^8 + A10S^{10}$$

wherein

Z is the distance from the lens vertex to the optical axis, y is the radial distance from the optical axis, C is the inverse of the radius of curvature, k represents the conic constant, A4, A6, A8, A10 represent aspherical coefficients.

The coefficients of the aspherical lens surfaces are listed in the following Table 2.

TABLE 2

| | Aspherical coefficients the fifteenth surface | Aspherical coefficients of the seventeenth surface |
|---|---|---|
| K | −0.6227864920718E+1 | −0.2872078151401E+2 |
| A4 | −0.8906054653676E−4 | −0.7320275643305E−4 |
| A6 | 0.3827149165004E−6 | 0.4136018707490E−6 |
| A8 | −0.1618405591476E−8 | −0.2053958451616E−8 |

Figure 2:
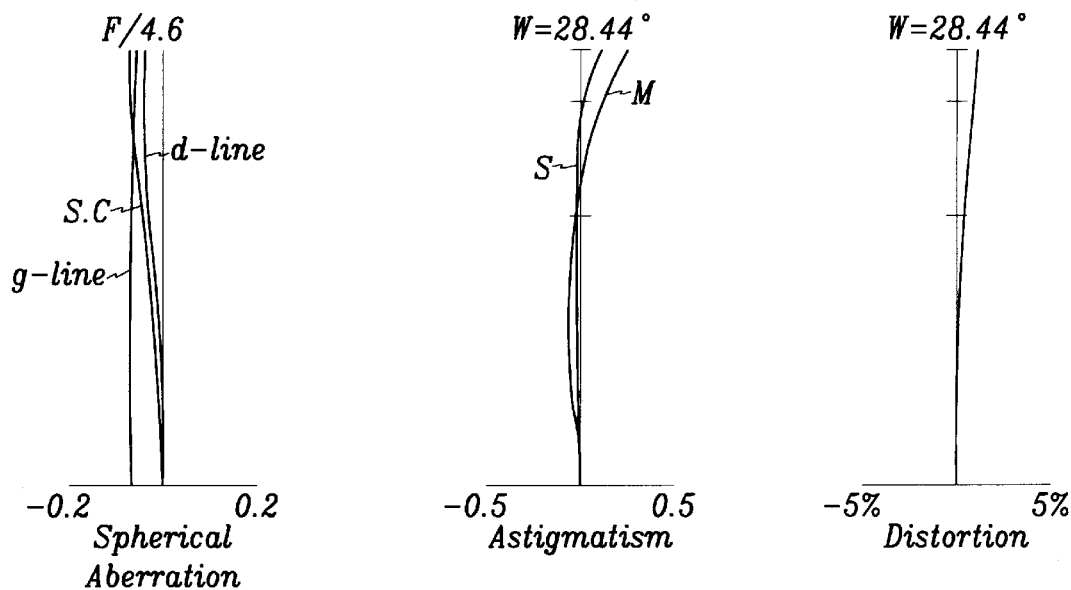
FIG. 2 shows aberration curves of a zoom lens system according to the first embodiment of the present invention at the wide-angle position.
Figure 3:
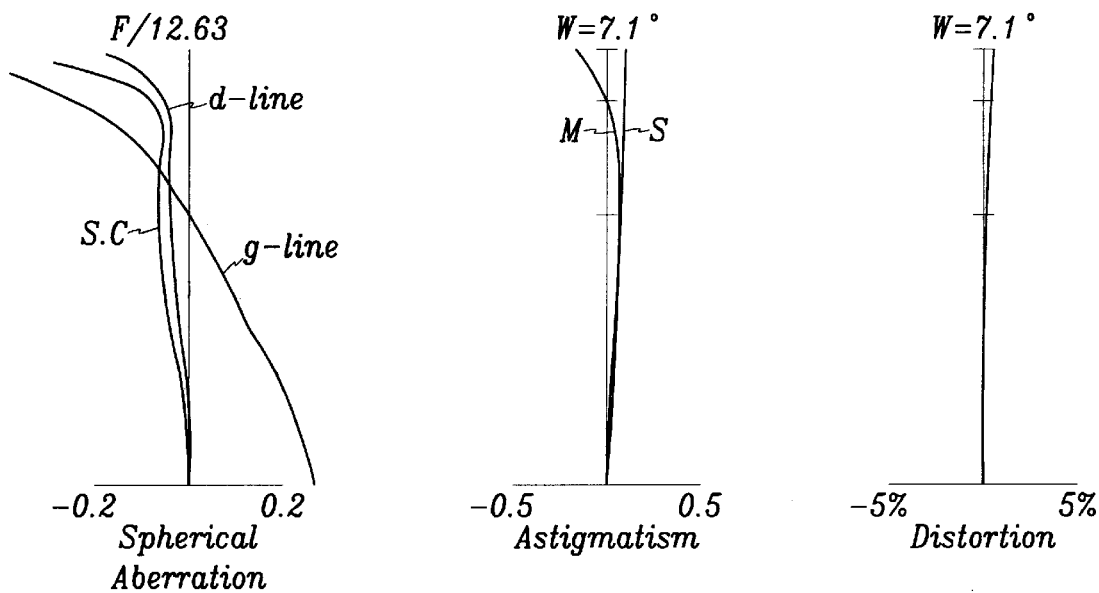
FIG. 3 shows aberration curves of the zoom lens system according to the first embodiment of the present invention at the telephoto position.
Figures 4A, 4B:
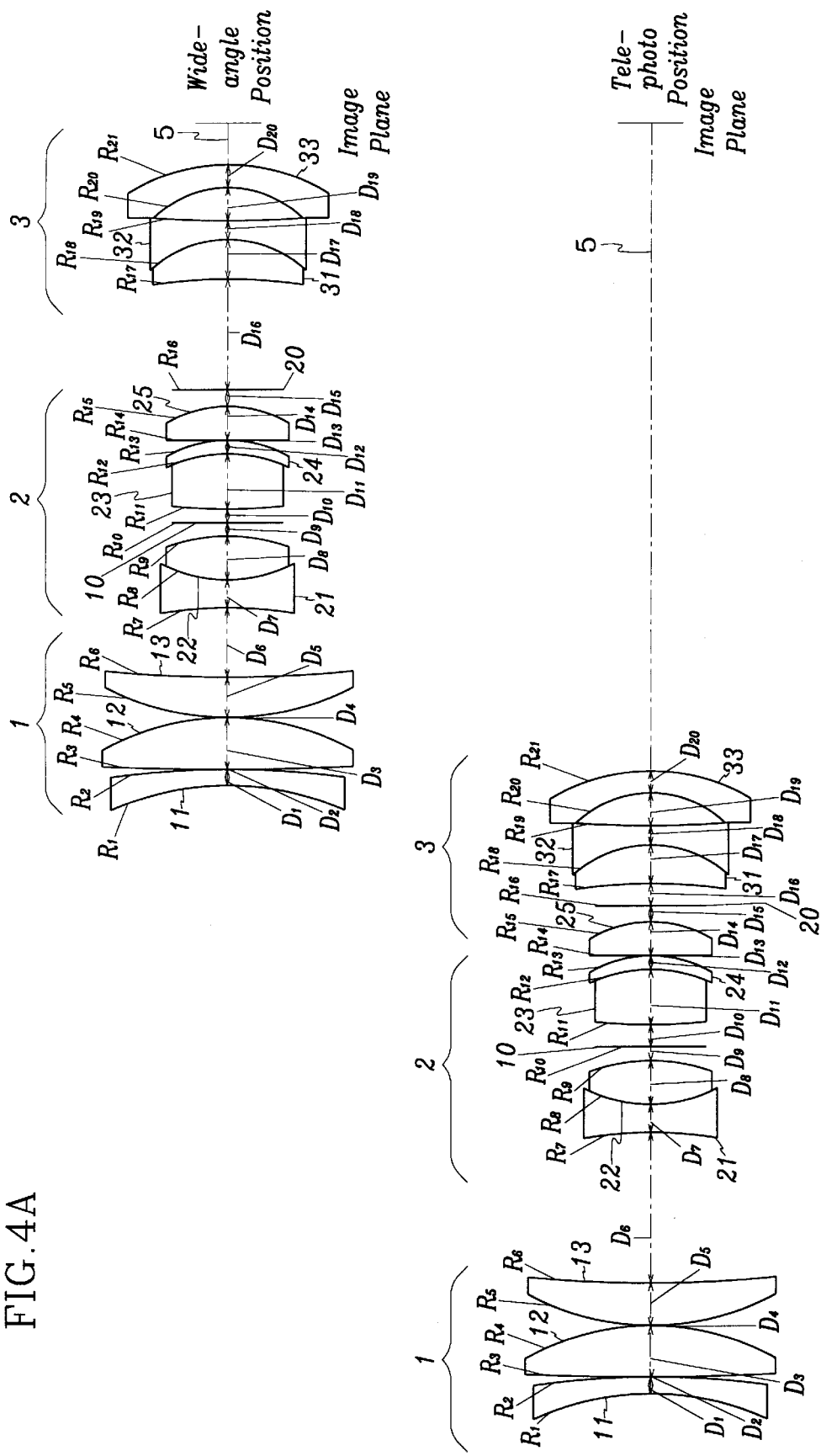
FIGS. 4A and 4B are side views of a zoom lens system in the wide-angle and telephoto positions, respectively, according to a second embodiment of the present invention.

FIGS. 2 and 3 illustrate superior aberration characteristics of the first embodiment at a wide-angle position and a telephoto position, respectively. In FIGS. 2 and 3, the following variables are used: S represents astigmatism in the sagittal direction; and M represents astigmatism in the tangential direction; SC represents light with a wavelength of 656.27 nm; g represents light with a wavelength of 435.84 nm; d represents light with a wavelength of 587.56 nm.

The second embodiment of the present invention is described below.

As shown in FIG. 4, the zoom lens system according to the second embodiment is constructed in the same manner as the zoom lens system of the first embodiment.

The zoom lens system according to the second embodiment of the present invention satisfies the following conditions:

$$ft/fw > 3.50 \quad (8)$$

$$Lt/ft < 1.00 \quad (9)$$

$$1.55 < (Lt-Lw)/fw < 2.35 \quad (10)$$

$$1.55 < (fbt-fbw)/fw < 2.35 \quad (11)$$

$$1.30 < f1/fw < 1.70 \quad (12)$$

$$0.60 < f2/fw < 1.00 \quad (13)$$

$$0.30 < |f3/fw| < 0.70 \quad (14)$$

$$3.0 < |f3a/fw| < 6.0 \quad (15)$$

wherein f3a is the focal length of the cemented lens formed by connecting the tenth lens 32 to the ninth lens 31 in the third lens group 3.

The conditions (8) to (14) are the same as conditions (1) to (7) with the exception that the upper and/or lower limits have been changed to correspond to the values used in the second embodiment. Accordingly, these conditions will not be described further.

Condition (15) is related to the refractive power of the cemented lens in the third lens group 3. If the lower limit of condition (15) is violated, then the refractive power of the cemented lens increases, leading to more severe aberrations, such as astigmatism, curvature of field and transverse chromatic aberration. If the upper limit of condition (15) is violated, then a high zoom ratio is difficult to achieve.

Data for the second embodiment of the present invention which satisfy the conditions (8) to (15) are shown in Table 3 in which the half viewing angle ranges from 28.44 to 7.09 the focal length ranges from 39.494 mm to 172.699 mm, the back focal length ranges from 7.990 mm to 90.406, and the F number ranges from 4.60 to 12.61.

TABLE 3

| surface number | Radius of curvature $R_i$ | distance $D_i$ | refractive power nd | Abbe number ν |
|---|---|---|---|---|
| 1 | −32.540 | 1.00 | 1.83500 | 42.98 |
| 2 | 575.357 | 0.10 | | |
| 3 | 69.675 | 4.00 | 1.48749 | 70.44 |
| 4 | −29.058 | 0.10 | | |
| 5 | 27.110 | 4.03 | 1.49700 | 81.61 |
| 6 | 489.293 | A | | |
| 7 | −21.337 | 1.62 | 1.83500 | 42.98 |
| 8 | 12.860 | 3.50 | 1.49700 | 28.32 |
| 9 | −37.709 | 1.21 | | |
| 10 | ∞ | 0.50 | | |
| 11 | 51.687 | 6.60 | 1.49700 | 81.61 |
| 12 | −13.790 | 1.04 | 1.84666 | 23.78 |
| 13 | −27.089 | 0.10 | | |
| 14 | −324.076 | 2.28 | 1.58913 | 61.25 |
| 15* | −19.458 | 1.20 | | |
| 16 | ∞ | B | | |
| 17* | −40.438 | 3.17 | 1.81474 | 37.03 |
| 18 | −14.233 | 1.00 | 1.49700 | 81.61 |
| 19 | 53.721 | 4.70 | | |
| 20 | −13.274 | 1.20 | 1.80420 | 46.50 |
| 21 | −41.077 | | | | where * represents an aspherical surface and A ranges from 2.8500 mm to 14.6991 mm and B ranges from 15.0807 mm to 2.6175 mm during zooming.

The coefficients of the aspherical lens surfaces are listed in the following Table 4.

TABLE 4

| | Aspherical coefficients the fifteenth surface | Aspherical coefficients of the seventeenth surface |
|---|---|---|
| K | −0.5226986417833E+1 | −0.3642734403422E+2 |
| A4 | −0.7171633901820E−4 | −0.5931983186656E−4 |
| A6 | 0.2139840061343E−6 | 0.4447741348046E−6 |
| A8 | −0.5317682219928E−9 | −0.2032630439287E−8 |

Figure 5:
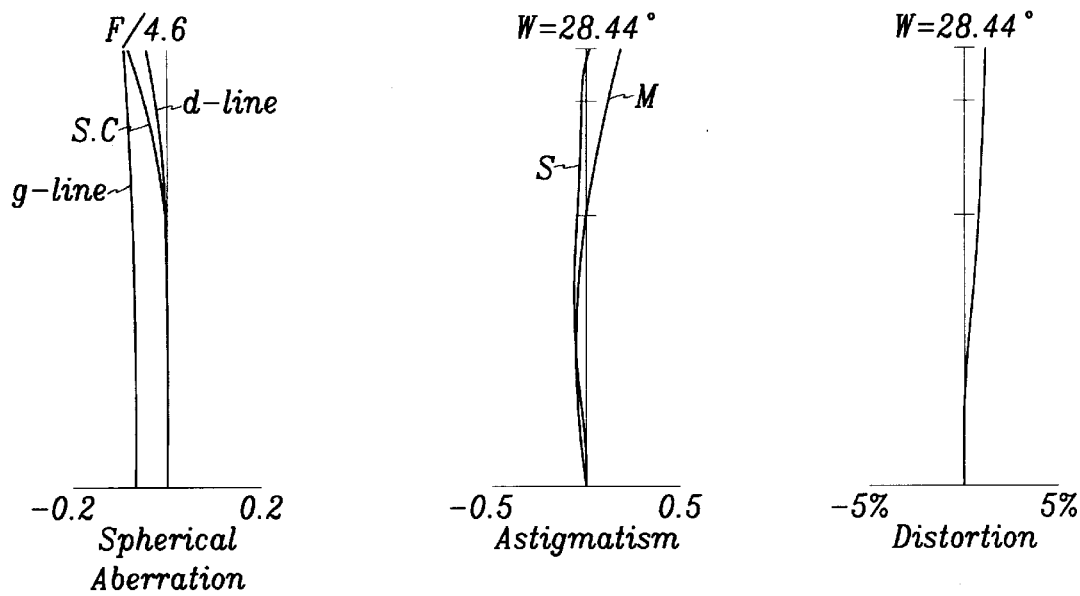
FIG. 5 shows aberration curves of the zoom lens system according to the second embodiment of the present invention at the wide-angle position.
Figure 6:
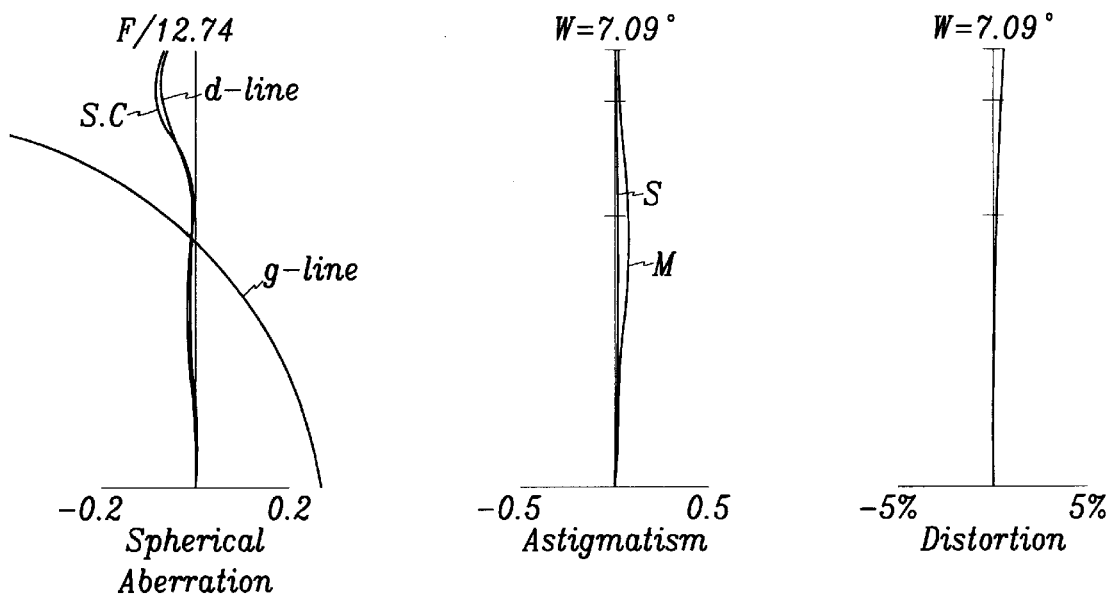
FIG. 6 shows aberration curves of the zoom lens system according to the second embodiment of the present invention at the telephoto position.

FIGS. 5 and 6 illustrate superior aberration characteristics of the second embodiment at a wide-angle position and a telephoto position, respectively.

The third embodiment of the present invention is described below.

Figure 7:
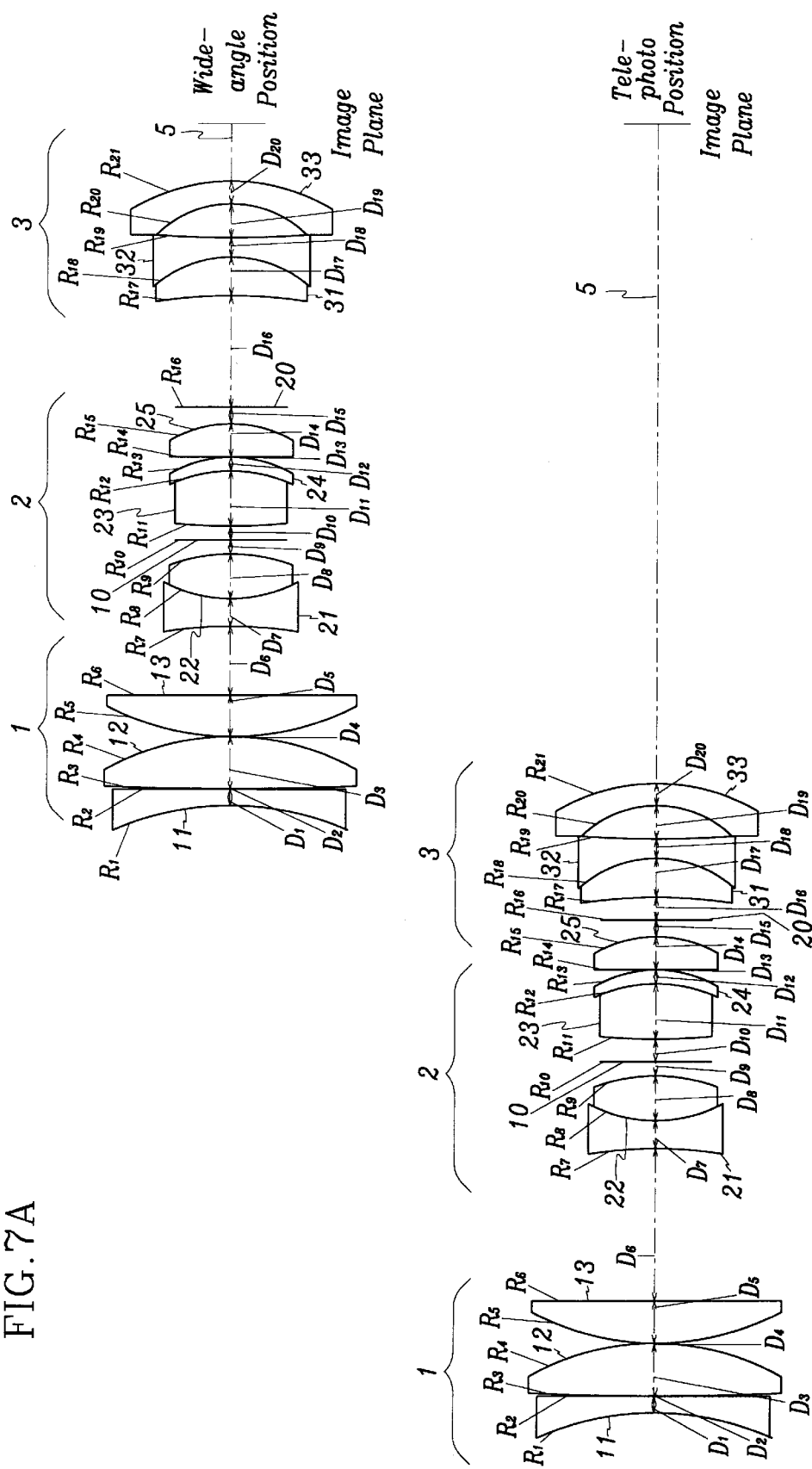
FIGS. 7A and 7B are side views of a zoom lens system in the wide-angle and telephoto positions, respectively, according to a third embodiment of the present invention at each position.

As shown in FIG. 7, the zoom lens system according to the third embodiment is constructed in the same manner as the zoom system of the first embodiment.

The zoom lens system according to the third embodiment of the present invention satisfies the following conditions:

$ft/fw>4.10$ (16)

$Lt/ft<0.90$ (17)

$1.60<(Lt-Lw)/fw<2.30$ (18)

$1.60<(fbt-fbw)/fw<2.30$ (19)

$1.30<f1/fw<1.70$ (20)

$0.60<f2/fw<1.00$ (21)

$0.30<|f3/fw|<0.70$ (22)

$0.7<|(R1-R2)/(R1+R2)|<1.27$ wherein
R1 is the radius of curvature of the first surface facing the object of the first lens 11; and
R2 is the radius of curvature of the first surface facing the image side of the first lens 11.

The conditions (16) to (22) are the same as conditions (1) to (7) with the exception that the upper and/or lower limits have been changed to correspond to the values used in the third embodiment. Accordingly, these conditions will not be described further.

The condition (23) relates to the shape of the first lens 11 in the first lens group 1. If the low limit of condition (23) is violated, then the refractive power of the first lens 11 decreases, which makes it difficult to obtain a good back focal length at a wide-angle position. The lenses are also more difficult to manufacture.

If the upper limit of condition (23) is violated, then it becomes difficult to compensate for spherical aberration and coma.

Data for the third embodiment of the present invention which satisfy the condition (16) to (23) are shown in Table 5 in which the half viewing angle ranges from 28.44 to 7.09 the focal length ranges from 39.497 mm to 172.943 mm, the back focal length ranges from 7.705 mm to 90.971, and the F number ranges from 4.60 to 12.74.

TABLE 5

| surface number | Radius of curvature $R_i$ | Distance $D_i$ | refractive power nd | Abbe number v |
|---|---|---|---|---|
| 1 | −30.634 | 1.00 | 1.83400 | 37.34 |
| 2 | 1863.965 | 0.10 | | |
| 3 | 78.339 | 4.00 | 1.51823 | 58.96 |
| 4 | −28.320 | 0.10 | | |
| 5 | 29.592 | 3.73 | 1.49700 | 81.61 |
| 6 | 1104.411 | A | | |
| 7 | −22.207 | 0.80 | 1.83500 | 42.98 |
| 8 | 12.604 | 3.50 | 1.74077 | 27.78 |
| 9 | −38.584 | 1.21 | | |
| 10 | ∞ | 1.06 | | |
| 11 | 68.098 | 6.60 | 1.51823 | 58.96 |
| 12 | −12.392 | 0.80 | 1.84666 | 23.78 |
| 13 | −29.664 | 0.13 | | |
| 14 | −1471.039 | 3.00 | 1.58913 | 61.25 |
| 15* | −17.530 | 1.20 | | |
| 16 | ∞ | B | | |
| 17* | −38.595 | 3.16 | 1.81474 | 37.03 |
| 18 | −14.073 | 1.00 | 1.49700 | 81.61 |
| 19 | 45.375 | 5.20 | | |
| 20 | −12.406 | 1.20 | 1.80420 | 46.50 |
| 21 | −30.560 | | | | where * represents an aspherical surface and A ranges from 2.8500 mm to 14.7424 mm and B ranges from 15.9006 mm to 2.6100 mm during zooming.

The coefficients of the aspherical lens surfaces are expressed in the following Table 6.

TABLE 6

| | Aspherical coefficients the fifteenth surface | Aspherical coefficients of the seventeenth surface |
|---|---|---|
| K | −0.4844149859566E+1 | −0.3392634291557E+2 |
| A4 | −0.9272859120446E−4 | −0.6128371663343E−4 |
| A6 | 0.3682265792195E−6 | 0.3682265792195E−6 |
| A8 | −0.1483873646789E−8 | −0.2167698646510E−8 |

Figure 8:
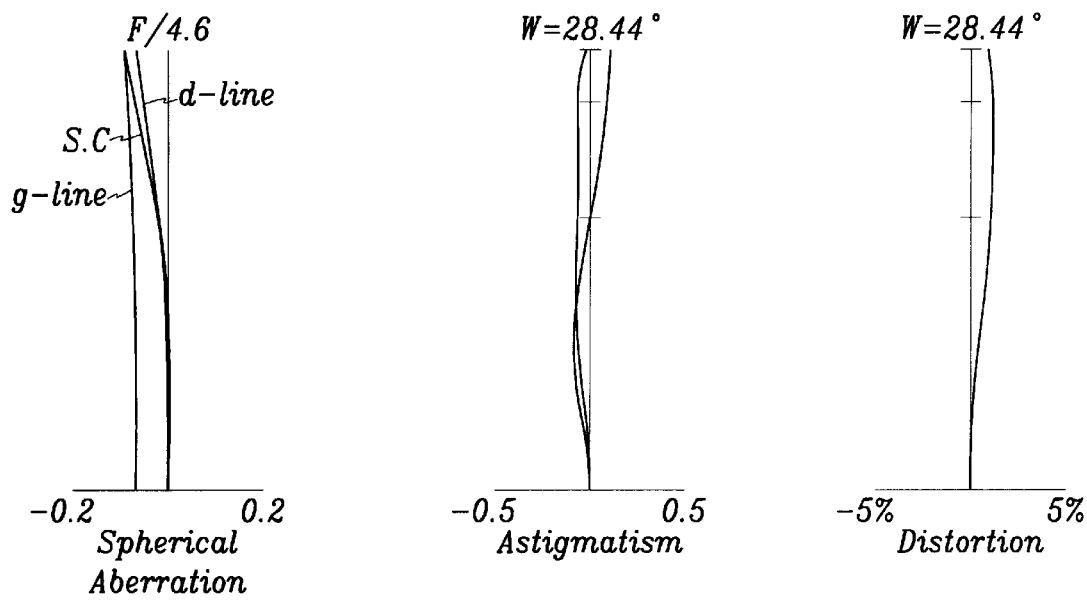
FIG. 8 shows aberration curves of the zoom lens system according to the third embodiment of the present invention at the wide-angle position.
Figure 9:
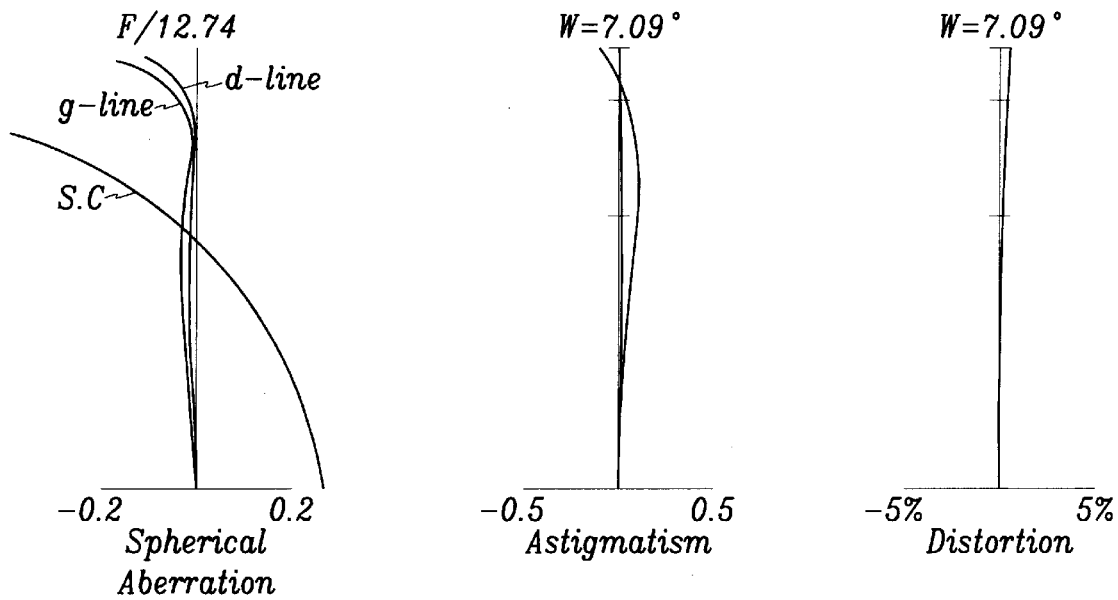
FIG. 9 shows aberration curves of the zoom lens system according to the third embodiment of the present invention at the telephoto position.

FIGS. 8 and 9 illustrate superior aberration characteristics of the third embodiment at a wide-angle position and a telephoto position, respectively.

A fourth embodiment of the present invention is described below.

As shown in FIG. 10, the construction of the zoom lens system according to the fourth embodiment is constructed in the same manner as the zoom system of the first embodiment.

The zoom lens system according to the fourth embodiment of the present invention satisfies the following conditions:

$ft/fw>3.50$ (24)

$Lt/ft<1.00$ (25)

$1.50<(Lt-Lw)/fw<2.40$ (26)

$1.50<(fbt-fbw)/fw<2.40$ (27)

$1.20<f1/fw<1.80$ (28)

$0.50<f2/fw<1.10$ (29)

$0.20<|f3/fw|<0.80$ (30)

$0.60<|(R1-R2)/(R1+R2)|<1.30$ (31)

$3.00<|f3a/fw|<6.00$ (32)

$0.30<f1p/f1<0.50$ (33)

$0.50<|f1n/f1|<0.70$ (34)

wherein
f1p is the composite focal length of the lenses in the first lens group 1 which have a positive refractive power; and
f1n is the composite focal length of the lenses in the first lens group 1 which have a negative refractive power.

Conditions (24) to (31) are the same as conditions (16) to (23) with the exception that their upper and/or lower limits have been changed to correspond to the values used in the fourth embodiment. Accordingly, these conditions will not be described further.

The condition (32) relates the refractive power of the cemented lens in the third lens group 3. If the lower limit of condition (32) is violated, then the refractive power of the cemented lens increases, thereby increasing the aberrations, such as astigmatism, curvature of field and chromatic. If the upper limit of condition (32) is violated, then a high zoom ratio would be difficult to achieve.

The conditions (33) and (34) relate to the refractive power of the first lens group 1. If the lower limits of conditions (33) and (34) are violated, then the refractive power of each lens group increases, which makes it is difficult to compensate for spherical aberration and coma. If the upper limits of conditions (33) and (34) are violated, then transverse chromatic aberration increases when zooming.

Data for the fourth embodiment of the present invention which satisfy the conditions (24) to (34) are shown in Table 7 in which the half viewing angle ranges from 28.44 to 7.09, the focal length ranges from 39.506 mm to 173.006 mm, the back focal length ranges from 7.708 mm to 91.007 mm, and the F number ranges from 4.60 to 12.63.

TABLE 7

| surface number | Radius of curvature $R_i$ | distance $D_i$ | refractive power nd | Abbe number ν |
|---|---|---|---|---|
| 1 | −32.370 | 1.00 | 1.83500 | 42.98 |
| 2 | 428.811 | 0.10 | | |
| 3 | 69.941 | 4.00 | 1.48749 | 70.44 |
| 4 | −29.131 | 0.10 | | |
| 5 | 28.916 | 3.56 | 1.49700 | 81.61 |
| 6 | −1379.189 | A | | |
| 7 | −23.013 | 1.82 | 1.83500 | 42.98 |
| 8 | 12.671 | 3.50 | 1.75520 | 27.53 |
| 9 | −42.632 | 1.21 | | |
| 10 | ∞ | 0.00 | | |
| 11 | 56.635 | 6.56 | 1.51680 | 64.20 |
| 12 | −12.839 | 1.16 | 1.84666 | 23.78 |
| 13 | −33.525 | 0.45 | | |
| 14 | −714.912 | 3.00 | 1.62299 | 58.12 |
| 15* | −18.070 | 1.20 | | |
| 16 | ∞ | B | | |
| 17* | −36.695 | 3.12 | 1.81474 | 37.03 |
| 18 | −13.992 | 1.00 | 1.49700 | 81.61 |
| 19 | 49.871 | 5.07 | | |
| 20 | −12.507 | 1.20 | 1.80420 | 46.50 |
| 21 | −31.129 | | | | where * represents an aspherical surface and A ranges from 2.8500 mm to 14.79824 mm and B ranges from 14.9473 mm to 2.6402 mm during zooming.

The coefficients of the aspherical lens surfaces are expressed in the following Table 8.

TABLE 8

| | Aspherical coefficients the fifteenth surface | Aspherical coefficients of the seventeenth surface |
|---|---|---|
| K | −0.4342615062247E+1 | −0.2781007020905E+2 |
| A4 | 0.7273661305199E−4 | −0.5846720309966E−4 |
| A6 | 0.2361026984804E−6 | 0.4539841373181E−6 |
| A8 | −0.8086363613068E−9 | −0.1965565496041E−8 |

Figure 11:
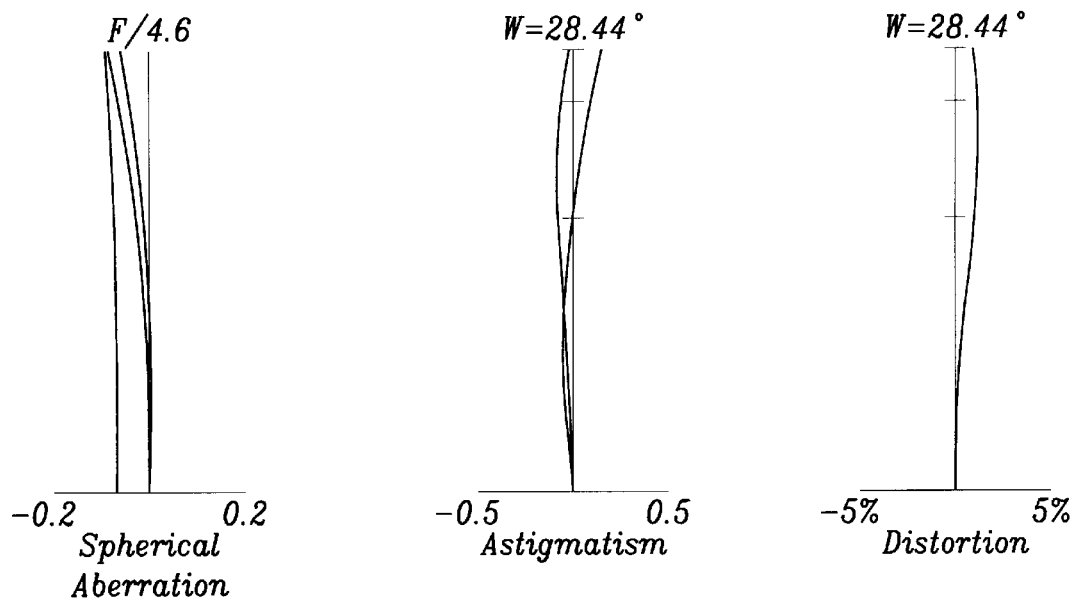
FIG. 11 shows aberration curves of a zoom lens system according to the fourth embodiment of the present invention at the wide-angle position.
Figure 12:
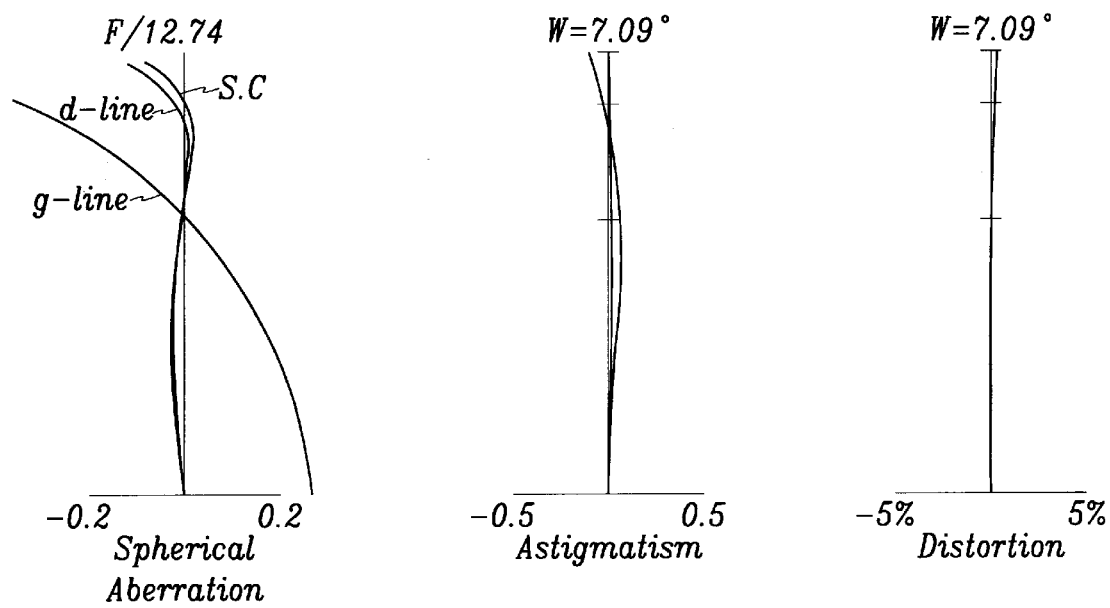
FIG. 12 shows aberration curves of the zoom lens system according to the fourth embodiment of the present invention at the telephoto position.

FIGS. 11 and 12 illustrate superior aberration characteristics of the fourth embodiment at a wide-angle position and a telephoto position, respectively.

As described above, the present invention in accordance with the embodiment constitutes a zoom lens system which has a compact construction and a high zoom ratio of more than 3.5.

While it has been shown and described what are at present the embodiment of the invention, it will be obvious to those skilled in the art that various changes and modification can be readily made therein without departing from the scope and sprit of the invention as defined by the appended claims.

What is claimed is:

1. A zoom lens system for imaging an object in an image plane, the lens system when viewed from the object side, comprising:

a first lens group with a positive refractive power;

a second lens group with a positive refractive power; and a third lens group with a negative refractive power;

wherein when zooming from a wide-angle position to a telephoto position, the first, second and third lens groups move towards the object side while the distance between the first lens group and the second lens group increases and the distance between the second lens group and the third lens group decreases;

the first lens group comprising a meniscus lens which has a negative refractive power and a concave surface facing the object side;

wherein the zoom lens system satisfies the following conditions:

$ft/fw > 4.10$ $Lt/ft < 0.90$ $1.60 < (Lt-Lw)/fw < 2.30$ $1.60 < (fbt-fbw)/fw < 2.30$ $0.6 < |(R1-R2)/(R1+R2)| > 1.30$ wherein fw is the focal length of the zoom lens system at the wide-angle position;

ft is the focal length of the zoom lens system at the telephoto position;

Lw is the distance between the surface facing the object of the lens closest to the object of the first lens group and the focal plane at the wide-angle position;

Lt is the distance between the surface facing the object of the lens closest to the object of the first lens group and the focal plane at the telephoto position;

fbw is the back focal length at the wide-angle position;

fbt is the back focal length at the telephoto position;

R1 is the radius of curvature of the object side surface of the meniscus lens in the first lens group; and R2 is the radius of curvature of the image plane side surface of the meniscus lens in the first lens group.

2. The zoom lens system of claim 1, wherein the zoom lens system further satisfies the following conditions:

$1.30 < f1/fw < 1.70$ $0.60 < f2/fw < 1.00$ $0.30 < |f3/fw| < 0.70$ wherein f1 is the focal length of the first lens group;

f2 is the focal length of the second lens group; and f3 is the focal length of the third lens group.

3. A zoom lens system for imaging an object in an image plane, the lens system when viewed from the object side, comprising:

first lens group with a positive refractive power;

a second lens group with a positive refractive power; and a third lens group with a negative refractive power, the third lens group comprising, in order from the object side, a first lens element which has a positive refractive power, a second lens element which is cemented to the first lens element and has a negative refractive power and a third lens element which has a negative refractive power;

wherein when zooming from a wide-angle position to a telephoto position, the first, second and third lens group move towards the object side while the distance between the first lens group and the second lens group increases and the distance between the second lens group and the third lens group decreases;

wherein the zoom lens system satisfies the following conditions:

$ft/fw > 3.50$ $Lt/ft<1.00$ wherein fw is the focal length of the zoom lens system at the wide-angle position;

ft is the focal length of the zoom lens system at the telephoto position; and

Lt is the distance between the surface facing the object of the lens closest to the object of the first lens group and the focal plane at the telephoto position.

4. The zoom lens system of claim 3, wherein the zoom lens system further satisfies the following conditions:

$1.55<(Lt-Lw)/fw<2.35$ $1.55<(fbt-fbw)/fw<2.35$ wherein

Lw is the distance between the surface facing the object of the lens closest to the object of the first lens group and the focal plane at the wide-angle position;

fbw is the back focal length at the wide-angle position; and fbt is the back focal length at the telephoto position.

5. The zoom lens system of claim 3, wherein the zoom lens system further satisfies the following conditions:

$1.30<f1/fw<1.70$ $0.60<f2/fw<1.00$ $0.30<|f3/fw|<0.70$ wherein f1 is the focal length of the lens group;

f2 is the focal length of the second lens group; and f3 is the focal length of the third lens group.

6. The zoom lens system of 3, wherein the zoom lens system further satisfies the following condition:

$3.00<|f3a/fw|<6.00$ wherein f3a is the composite focal length of the second lens element and the first lens element in the third lens group.

7. A zoom lens system for imaging an object in an image plane, the lens system when viewed from the object side, comprising:

first lens group with a positive refractive power;

a second lens group with a positive refractive power; and a third lens group with a negative refractive power;

wherein when zooming from a wide-angle position to a telephoto position, the first, second and third lens groups move towards the object side while the distance between the first lens group and the second lens group increases and the distance between the second lens group and the third lens group decreases;

the first lens group comprising a first lens element which has a negative refractive power and an object side surface as a concave surface toward the object side;

wherein the zoom lens system satisfies the following conditions:

$ft/fw>4.10$ $Lt/ft<0.90$ $0.7<|(R1-R2)/(R1+R2)|<1.27$ wherein fw is the focal length of the zoom lens system at the wide-angle position;

ft is the focal length of the zoom lens system at the telephoto position;

Lt is the distance between the surface facing the object of the lens closest to the object of the first lens group and the focal plane at the telephoto position;

R1 is the radius of curvature of the object side surface of the first lens element of the first lens group; and R2 is the radius of curvature of an image plane side surface of the first lens element of the first lens group.

8. The zoom lens system of claim 7, wherein the zoom lens system further satisfies the following conditions:

$1.60<(Lt-Lw)/fw<2.30$ $1.60<(fbt-fbw)/fw<2.30$ wherein

Lw is the distance between the surface facing the object of the lens closest to the object of the first lens group and the focal plane at the wide-angle position;

fbw is the back focal length at the wide-angle position; and fbt is the back focal length at the telephoto position.

9. The zoom lens system of claim 7, wherein the zoom lens system further satisfies the following conditions:

$1.30<f1/fw<1.70$ $0.60<f2/fw<1.00$ $0.30<|f3/fw|<0.70$ wherein f1 is the focal length of the first lens group;

f2 is the focal length of the second lens group; and f3 is the focal length of the third lens group.

10. A zoom lens system for imaging an object in an image plane, the lens system when viewed from an object side, comprising:

a first lens group with a positive refractive power, the first lens group comprising a first lens element with a negative refractive power and an object side surface as a concave surface facing the object side and a second lens component which has at least one lens with a positive refractive power;

a second lens group with a positive refractive power; and a third lens group with a negative refractive power, the third lens group comprising a third lens element with a positive refractive power, a fourth lens element with a negative refractive power and a fifth lens element with a negative refractive power;

wherein when zooming from a wide-angle position to a telephoto position, the first, second and third lens groups move towards the object side while the distance between the first lens group and the second lens group increases and the distance between the second lens group and the third lens group decreases; and wherein the fourth lens element is cemented to the third lens element so as to form a cemented lens with a negative refractive power;

wherein the zoom lens system satisfies the following conditions:

$ft/fw > 3.50$ $Lt/ft < 1.00$ $0.6 < |(R1-R2)/(R1+R2)| < 1.30$ wherein
- fw is the focal length of the zoom lens system at the wide-angle position;
- ft is the focal length of the zoom lens system at the telephoto position;
- Lt is the distance between the surface facing the object of the lens closest to the object of the first lens group and the focal plane at the telephoto position;
- R1 is the radius of curvature of the object side surface of the first lens element in the first lens group; and
- R2 is the radius of curvature of the image plane side surface of the first lens element in the first lens group.

11. The zoom lens system of claim 10, wherein the zoom lens system further satisfies the following conditions:

$1.50 < (Lt-Lw)/fw < 2.40$ $1.50 < (fbt-fbw)/fw < 2.40$ wherein
- Lw is the distance between the surface facing the object of the lens closest to the object of the first lens group and the focal plane at the wide-angle position;
- fbw is the back focal length at the wide-angle position; and
- fbt is the back focal length at the telephoto position.

12. The zoom lens system of claim 10, wherein the zoom lens system further satisfies the following conditions:

$1.20 < f1/fw < 1.80$ $0.50 < f2/fw < 1.10$ $0.20 < |f3/fw| < 0.80$ wherein
- f1 is the focal length of the first lens group;
- f2 is the focal length of the second lens group; and
- f3 is the focal length of the third lens group.

13. The zoom lens system of claim 10, wherein the zoom lens system further satisfies the following condition:

$3.00 < |f3a/fw| < 6.00$ wherein
- f3a is the focal length of the cemented lens in the third lens group.

14. The zoom lens system of claim 10, wherein the zoom lens system further satisfies the following conditions:

$0.30 < f1p/f1 < 0.50$ $0.50 < |f1n/f1| < 0.70$ wherein
- f1 is the focal length of the first lens group;
- f1p is the focal length of the second lens component in the first lens group with a positive refractive power; and
- f1n is the focal length of the first lens element in the first lens group with a negative refractive power.

* * * * *